March 7, 1939.　　F. D. VAN NORMAN ET AL　　2,149,409
OSCILLATING GRINDER
Filed Aug. 12, 1936　　9 Sheets-Sheet 1

INVENTORS
FREDERICK D. VAN NORMAN,
BYRON F. STOWELL, AND
ROGER S. PYNE
BY Chapin + Neal
ATTORNEYS March 7, 1939.  F. D. VAN NORMAN ET AL  2,149,409
OSCILLATING GRINDER
Filed Aug. 12, 1936　　9 Sheets-Sheet 4

INVENTORS
FREDERICK D. VAN NORMAN,
BYRON F. STOWELL, AND
ROGER S. PYNE
BY Clapin + Neal
ATTORNEYS

INVENTORS
FREDERICK D. VAN NORMAN, BYRON F. STOWELL,
AND ROGER S. PYNE
BY Chapin & Neal
ATTORNEYS March 7, 1939.　　F. D. VAN NORMAN ET AL　　2,149,409
OSCILLATING GRINDER
Filed Aug. 12, 1936　　9 Sheets-Sheet 7

Fig. 22.　HANDLE 130 DEPRESSED

Fig. 23.　SLIDES REACH GRINDING POSITION

Fig. 24.　FIRST GAUGE CONTACT MADE

INVENTORS
FREDERICK D. VAN NORMAN,
BYRON F. STOWELL, AND
ROGER S. PYNE
BY Chapin + Neal
ATTORNEYS Fig. 25. SECOND GAUGE CONTACT MADE Fig. 26. TIME DELAY RELAY COMPLETES OPERATION Fig. 27. Slides completely retracted Fig. 28. Oscillator motor stopped Patented Mar. 7, 1939

2,149,409

UNITED STATES PATENT OFFICE 2,149,409

OSCILLATING GRINDER

Frederick D. Van Norman, Byron F. Stowell, and Roger S. Pyne, Springfield, Mass., assignors to Van Norman Machine Tool Company, Springfield, Mass., a corporation of Massachusetts Application August 12, 1936, Serial No. 95,514

31 Claims. (Cl. 51—97)

This invention relates to grinding machines, primarily those of the oscillating type where the work carrying head oscillates to permit a grinding wheel to cut a grooved raceway in the work piece. Attempts have heretofore been made to cause the proper coordination of the several functions of these machines by automatic controls, mainly hydraulic. Such hydraulic controls have been subject to numerous disadvantages, of the most part of the nature of variability in operation due to the leakage and the change in the viscosity of the oil used as the machine was continued in use.

The object of the present invention is to provide a novel mechanical coupling between the parts of an oscillating grinder whereby they may be more effectively controlled by simple motive power means. The mechanism for shifting the slides which support the grinding wheel are thus controlled in their various movements by a single power means. A further object of the invention is to provide means for terminating the travel of power actuated slide mechanism at definite end points. A further object is to provide novel mechanism for stopping the oscillating work carrying head at a predetermined time in the operation of the machine and in a predetermined angular position which will assist in the replacement of the work piece. Additional objects will appear from the following description and claims.

Referring to the drawings.

The grinding machine to which the invention is applied is of the general type shown in the Van Norman Reissue Patent 13,892, and in its general aspects need be described only sufficiently to indicate the relations of the several parts. The machine has a frame 20 in which is journaled a vertical shaft 21 carrying at its upper end a head 22. Upon an adjustable cross slide 23 on this head is mounted a spindle head 24, the spindle of which is rotated in any convenient manner and which bears a chuck 25 adapted to receive the work piece $w$, here shown as the outer race of a ball bearing. The chuck may be made in the form described in the Stowell Patent 1,812,455, June 30, 1931, and needs no further description here. Also carried by the spindle head 24 is a sizing gauge indicated generically by 26 and bearing a diamond point 27 adapted to contact with the surface of the work piece being ground. This gauge enters into the operation of certain parts to be described later, but as its construction is identical with that described in the Stowell Patent 1,926,603, September 12, 1933, reference is made to that patent for the mechanical construction of the gauge and for the general nature of its electrical connections.

The head 22 is oscillated continuously during the grinding operation. The shaft 21 is shown as being provided with a crank pin 28 (Fig. 1) for this purpose, coupled by a connecting rod 29 to a crank 30 on the upper end of a vertical shaft 31 which may be continuously rotated as by worm gearing 32 from a horizontal shaft driven by a suitable motor (not shown) which actuates a pulley 33.

Figures 1, 2, 3, 4:
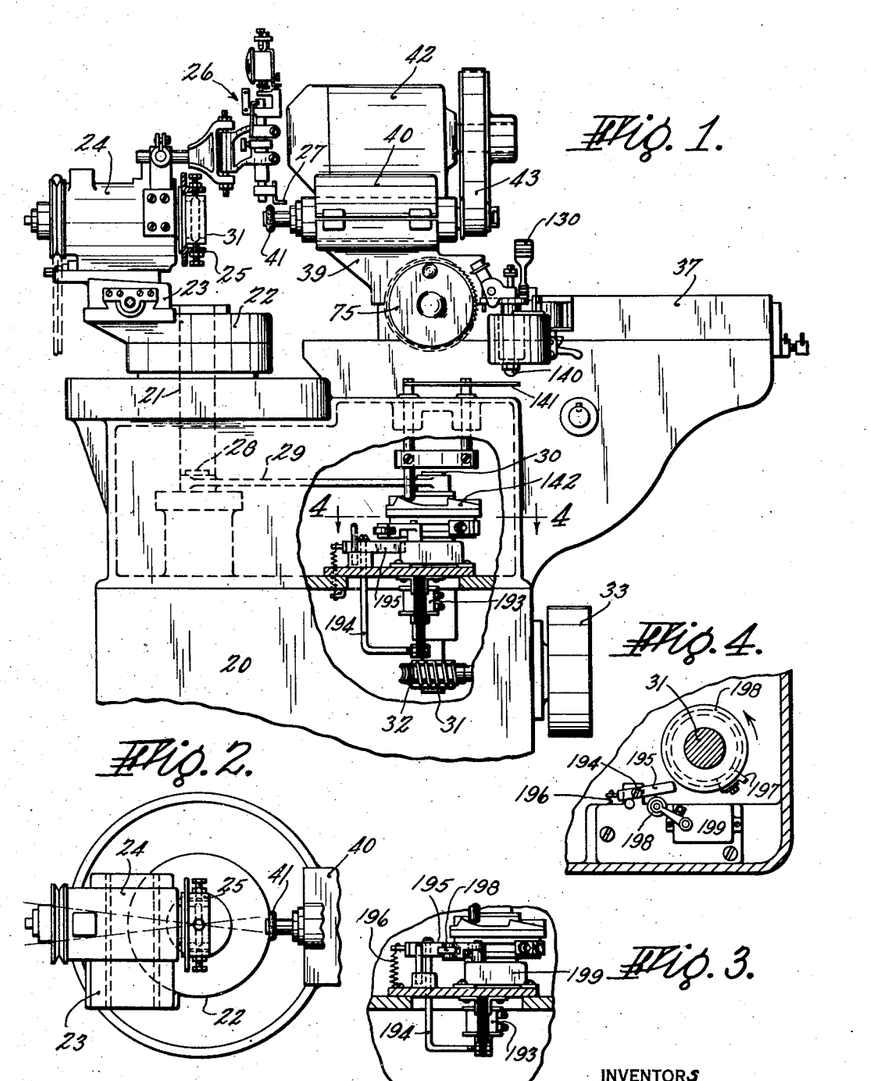
Fig. 1 is a side elevation of an oscillating grinder, partially broken away, illustrating the general type of machine to which the invention is applied and also certain features of the invention itself.
Fig. 2 is a detail top plan view illustrating the coordination between the oscillating head and the grinding wheel.
Fig. 3 is a detail of parts appearing in Fig. 1, but in a different position of operation.
Fig. 4 is a detail section on line 4—4 of Fig. 1.

The frame 20 is provided with ways 35 and 36 (Fig. 12), the latter of V-form, in which is mounted a main slide 37. On ways 38 (Fig. 5) on the main slide is mounted a cross slide 39 bearing a spindle head 40 carrying a grinding wheel 41. The grinding wheel spindle is driven in any suitable way, as by a motor 42 coupled to the spindle through a belt drive 43. For changing work pieces in the chuck 25 the grinding wheel is retracted from the work piece as shown in Fig. 2 and in full lines in Fig. 5. In order to start the grinding operation it is necessary to move the grinding wheel to the left as viewed in these figures, and then to move it in the plane of the work piece towards the upper part of the sheet as viewed in Fig. 2. This is accomplished by successive movements of the main and the cross slides, and in accordance with the present invention there is provided electrically operated mechanism for causing these successive movements. Before describing the electrical control means the novel mechanical arrangements which permit this type of control will be considered.

Figures 7, 8, 9, 10, 11:
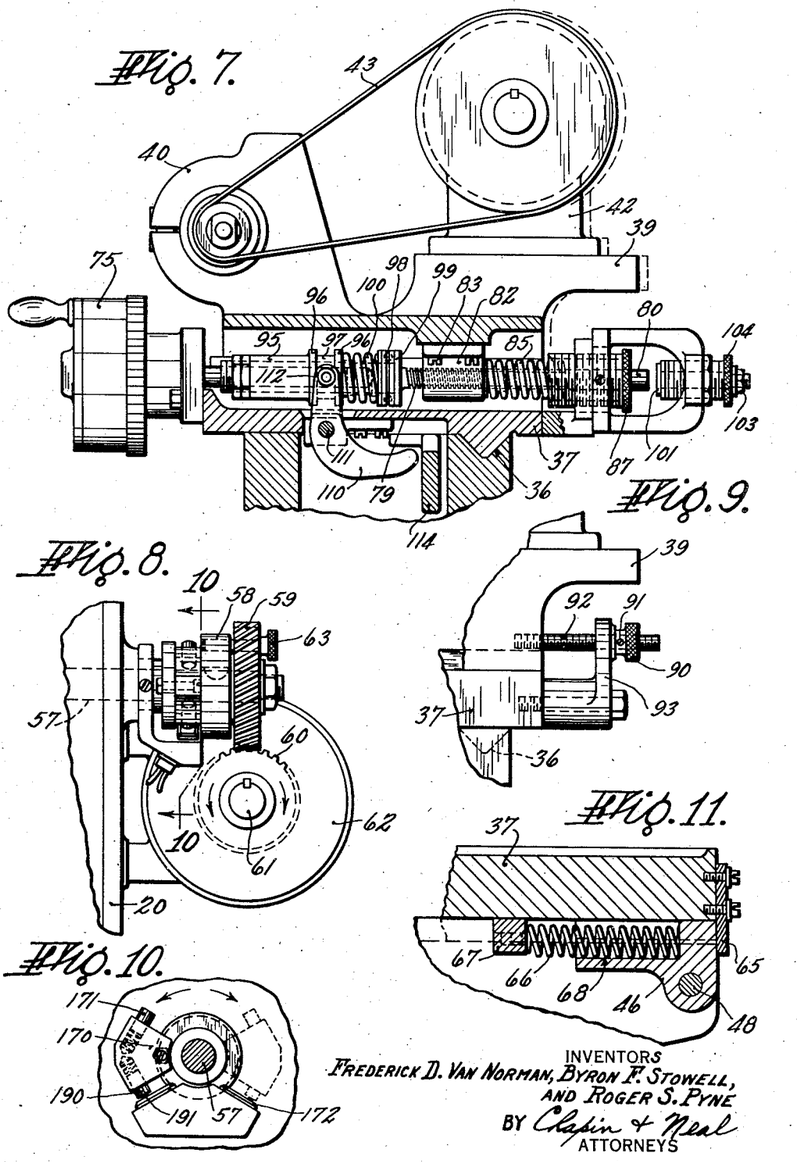
Fig. 7 is a sectional view on line 7—7 of Fig. 5.
Fig. 8 is a detail of the driving gearing for the main slide.
Fig. 9 is a detail of the return stop mechanism for the cross slide.
Fig. 10 is a detail of the switch control mechanism regulating the motion of the main slide, taken on line 10—10 of Fig. 8.
Fig. 11 is a section on line 11—11 of Fig. 6.

On the lower part of the main slide 37 is a slideway 45 (Fig. 6) in which a short slide 46 is mounted by means of gibs 47. The slide 46 is provided with a stud 48 (Figs. 5, 6 and 14) by which it may be operated. A link 49 is slotted at 50 to embrace the stud, and is held in lateral position by a spacing collar 51 (Fig. 6) and by a nut 52. A screw 53, having a squared wrench receiving end 54, is mounted in one end of the link so as to extend within the slot and so as to be permitted a free rotative movement but no longitudinal movement with respect to the link. The screw is threaded into the stud 48 and furnishes a means by which the relative positions of the slide 46 and the link may be adjusted. The other end of the link is pivoted at 55 to an arm 56 secured to a shaft 57 journaled in the frame. As seen in Fig. 8, this shaft has a disk 58 fixed to it, and carries adjacent the disk a spiral gear 59 freely rotatable on the shaft. The gear 59 meshes with a second spiral gear 60 fixed on the shaft 61 of a motor 62 of the reversible type. Normally the disk 58 and the gear 59 are held together for rotation by a pin 63, the pin being removable so that the slide may be operated by hand if desired. The motor is successively driven in opposite directions so as to give to the shaft 57 first a rotation of about 180° to shift the main and cross slides to grinding position, and then an equal rotation in the opposite direction when it is desired to retract the slides in order to change work pieces. The motor 62 is energized only when the slides are moving towards or from grinding position, and remains inactive throughout the grinding operation.

Figures 5, 6:
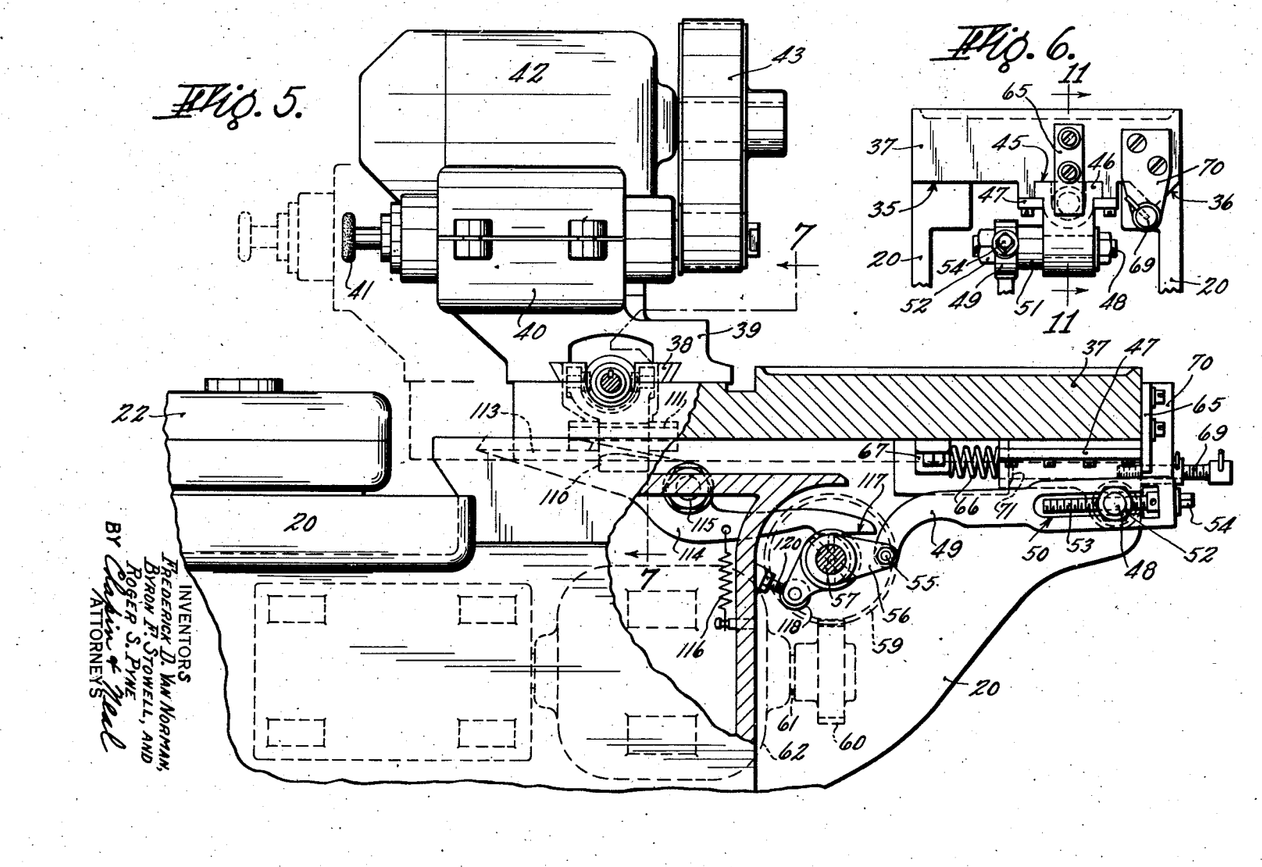
Fig. 5 is a side elevation, partly broken away, of the wheel carrying slide.
Fig. 6 is an end view of parts shown in Fig. 5.

In the movement of the main slide away from grinding position, or towards the right as viewed in Fig. 5, it is driven positively by the contact of the end of the small slide 46 with a stop 65 secured to the end of the main slide. In its motion in the opposite direction the main slide is driven by the small slide through the intervention of a spring 66 (Fig. 11) bearing at one end against an abutment 67 secured to the main slide and received at its other end in a recess 68 formed in the small slide. The purpose of this construction is to permit the motion of the main slide into grinding position to be determined by a positive stop rather than by the oscillatory movement of the shaft 57, any overtravel of the shaft being taken up by the compression of the spring. The spring is stiff enough so that for all practical purposes the connection between the two slides is rigid during the motion of the main slide, the yielding effect of the spring coming into play only after the main slide has made contact with the stop. The stop is in the form of a screw 69 (Figs. 5, 6 and 14) threaded through a bracket 70 depending from the main slide 37 and adapted to contact an abutment 71 on the frame.

The cross slide 49 which carries the grinding spindle is arranged for a slow transverse feeding motion under the control of a ratchet head 75 (Figs. 1 and 7) of the general type shown in the Stowell Patent 1,926,603. In the present case there is added to the control given by this ratchet head, which will be considered in detail below, a secondary control under the influence of the driving mechanism for the main slide which serves to give to the cross slide a relatively large scale motion into or out of grinding position. The grinding wheel works in a semi-circular groove in the work piece which is generaly the outer race of a ball or roller bearing, and it will be apparent that the wheel cannot be drawn directly out of this groove in an axial direction by the action of the main slide, but must be first given a short motion towards the center of the work piece to prevent it from coming into contact with either the work piece or the chuck. To accomplish this, certain changes have been made in the connections between the ratchet head and the cross slide, and certain connections have been made between the cross slide and the shaft 57 which drives the main slide. The variations in the ratchet drive connections do not affect the operation of the ratchet itself, which is controlled as will be described below substantially as in the Stowell patent referred to, but only the manner in which the shaft of the ratchet head is coupled to the cross slide. This coupling will now be considered with particular reference to Figs. 7, 12 and 13.

The shaft 76 of the ratchet head is shorter than that of the patent referred to, and is received within a recess 77 (Fig. 12) formed in a sleeve 78 which forms one part of a shaft having several functionally separated portions along its length. Besides the sleeve portion 78 the shaft has an intermediate threaded portion 79 and a stop portion 80 of cylindrical form at its end remote from the sleeve. The shaft 76 is keyed to the sleeve 78 at 81, so that while they always rotate together the sleeve may have an axial motion relative to the shaft. The intermediate portion 79 of the composite shaft is threaded into a nut 82 held as by screws 83 to the cross slide 39. If the composite shaft is held longitudinally fixed but is rotated the cross slide will be moved by a screw action under the control of the ratchet head 75. This is the mode of operation during the slow progressive advance of the cross slide that occurs during the grinding operation. If the composite shaft is held against rotation but is moved longitudinally the cross slide will be carried bodily with it. This is the mode of operation during the lateral movement of the grinding wheel into and out of grinding position.

Figure 12:
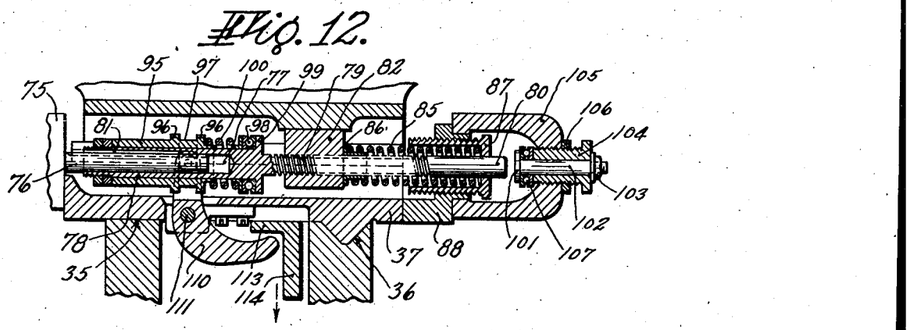
Fig. 12 is a detail corresponding to a portion of Fig. 7 but with certain parts shown in median section.

The cross slide is constantly urged towards the left as viewed in Fig. 12 by a spring 85. At one end this spring seats on a collar 86 slidable on the threaded part 79 of the composite shaft; and at the other end it seats within a recessed nut 87 threaded into a bracket 88 suitably attached to the cross slide. The limiting position into which the cross slide can be moved by the spring is determined by a thumb nut 90 (Fig. 9) secured in adjusted position by a set screw 91 upon a screw 92 set into the cross slide and passing through a bracket 93 bolted to the main slide 37. This construction does not show in Figs. 7, 12 and 13 because of the sections on which those views are taken. By changing the setting of the thumb nut the position of the cross slide to which it returns laterally before retracting the grinding wheel axially from the work piece can be regulated.

Figures 13, 14:
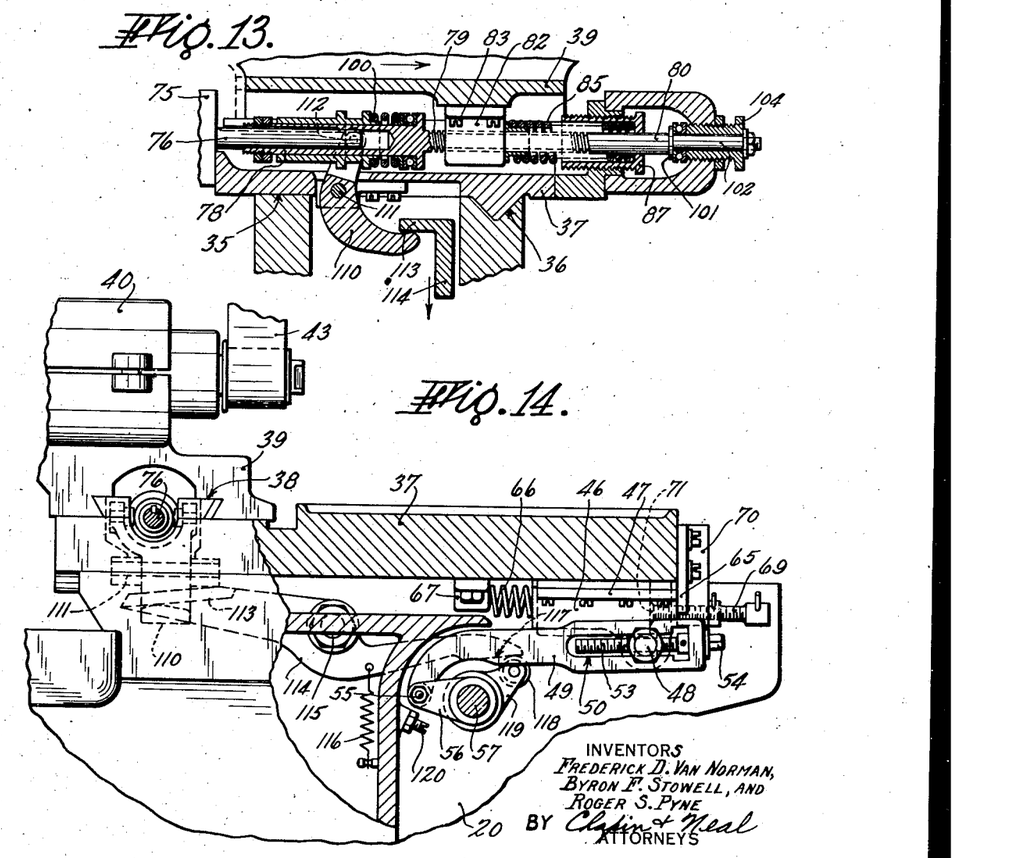
Fig. 13 is a view corresponding to Fig. 12 but with the parts in a different position of operation.
Fig. 14 is a view corresponding to a portion of Fig. 5 but with certain parts in a different position of operation.

Movement of the cross slide to grinding position is under the control of the same devices as used for advancing the main slide. Slidable over the sleeve 78 is an outer sleeve 95 (Figs. 7 and 12) having flanges 96 forming between them an annular groove 97. Between one of the flanges 96 and a ball bearing 98 resting against a flange 99 on the composite shaft is a compression spring 100 of a somewhat greater stiffness than the spring 85. If the outer sleeve 95 is moved to the right in Fig. 7 the composite shaft will be moved to the right until it strikes a stop 101 as indicated in Fig. 13; any surplus motion of the outer sleeve 95 being taken up by the spring 100. By this means there need be no adjustment of the mechanism operating the outer sleeve in order to accommodate different grinding positions desired for the cross slide, all of the adjustment for this position being secured by changing the position of the stop 101. The stop is preferably made as shown in Fig. 12, comprising an enlarged end on a rod 102 held by a nut 103 in place within a member 104 threaded into a cap piece 105 carried by the bracket 88. The member 104 is held in adjusted position by a lock nut 106. In order to permit the stop 101 to turn, as it must do when the cross slide is in grinding position and the composite shaft is being rotated in order to feed the grinding wheel progressively into the work, a ball bearing 107 is interposed between the stop 101 and the end of the member 104.

To operate the outer sleeve 95 and to shift the cross slide into grinding position a bell crank 110 is pivoted to the main slide at 111 and bears a pair of rollers 112 (Fig. 13) in its forked upper end, the rollers being located within the annular groove 97 of the outer slide. The lower end of the bell crank is curved so that when the main slide approaches grinding position this end will underlie a ledge 113 formed on an arm 114 pivoted to the framt 20 at 115 (Fig. 14). The arm 114 is held by a spring 116 so that unless it is positively moved the ledge will be in its upper position shown in Fig. 12, in which the lower end of the bell crank 110 can pass freely beneath it. The end of the arm 114 remote from the ledge 113 is provided with a bearing portion 117 adapted to be raised as shown in Fig. 14 by a roller 118 on an arm 119 fixed to the oscillating shaft 57.

The operation of the mechanism thus far described can now be considered. The retracted position of the main slide and the cross slide is shown in Figs. 5, 7 and 12. The main slide 37 has been pushed by the short slide 46 to the full line position of Fig. 5, at which time the arm 119 comes against a stop 120 on the frame. The tail of the bell crank 110 is free of the ledge 113, and the cross slide 39 is therefore held by the spring 85 in that position determined by the adjustment of the thumb nut 90. If now the motor 62 is started in the proper direction the shaft 57 will be rotated from the position of Fig. 5 towards that of Fig. 14. The first effect of this will be that the link 49 draws the slide 46, and through the spring connection 66 the main slide 37, until the stop 69 strikes the abutment 71. The main slide 37 will then cease to move, but the rotation of the shaft 57 will continue, the motion of link 49 thereafter merely causing compression of the spring 66. At about the time the main slide stops the tail of the bell crank 110 will have been carried underneath the ledge 113, and during the latter part of the motion of the shaft 57 the arm 119 will raise its roller 118 against the arm 114 and will cause the ledge 113 to descend. The consequent rocking of the bell crank 110 will, as seen in Fig. 13, cause the composite shaft to move to the right as viewed in that figure, carrying the cross slide with it until the stop portion 80 of that shaft strikes the stop 101. Excess motion of the shaft 57 will thereafter merely compress the springs 66 and 100 without producing any further movement of the parts. The motor 62 is thereupon stopped by means to be described, and remains at rest while the cross slide is further advanced by the ratchet head. As soon as the grinding operation is completed the reverse cycle of operations occurs. The excess compression of the springs is first removed, the cross slide is then moved back to its inactive position by the release of the bell crank 110, and the main slide is finally brought back to its inactive position. During this latter phase the motion of the ratchet head which occurred during the grinding operation is preferably reversed as by the mechanism shown in the Stowell Patent 1,918,147, July 11, 1933, so that when the next cycle occurs the grinding wheel will be brought by the action of the cross slide only to the position required for the start of the grinding.

The remaining mechanical details can best be considered in connection with the electrical control by which those parts already described are coordinated. The electrical system is made up of standard parts which in their details form no part of the present invention, and which therefore need not be described in detail. The electrical connections are shown in diagrammatic form for the reason that this type of representation will give a clearer picture of the relationship of the elements than would a more detailed description of the actual circuits. In the diagrams the controlling circuits are carried only to the point of operating the contactors which themselves close the circuits through the motors, and the circuits operated by these contactors are not indicated. As is customary in diagrams of this type, mechanical connections between electrically separate switches are shown by dotted lines, the details of the mechanical connections being described elsewhere in the specification.

Figure 21:
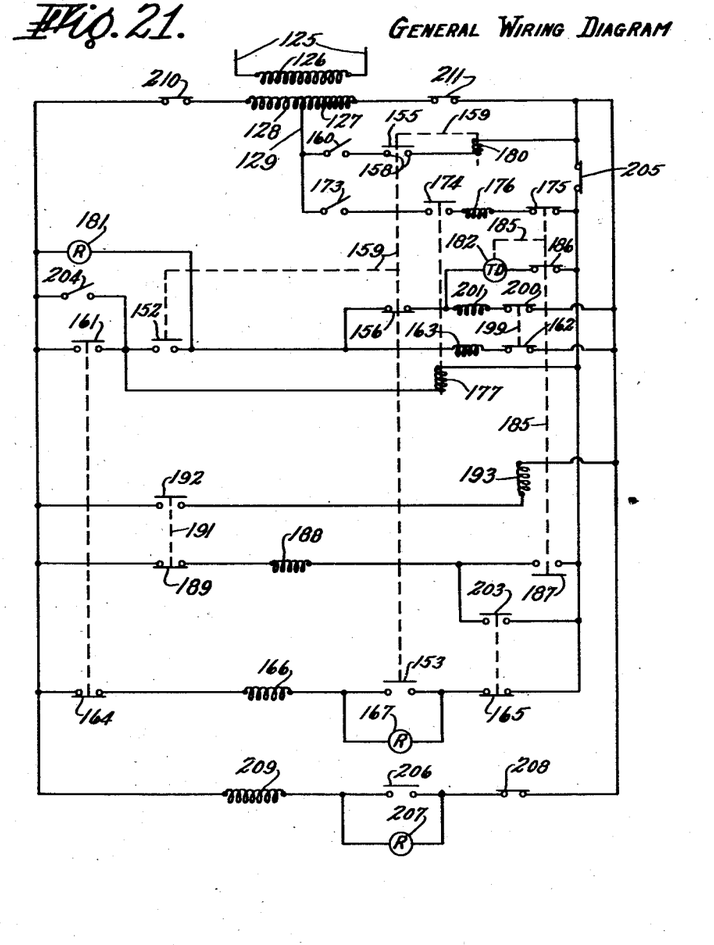
Fig. 21 is a general wiring diagram.

Fig. 21 shows a general wiring diagram of the control circuits. In order to simplify the description of successive circuit conditions this diagram has been broken down in Figs. 22 to 28 so that only those portions of the system which are acting at a particular time are shown. In these partial views the omitted circuits are in an open condition at the period under consideration. The electrical power is derived from a main line 125 operating through a transformer 126, the secondary of which is divided into two sections 127 and 128 by an intermediate tap 129. The portion of the secondary circuit bridging the section 127 furnishes current at a relatively low voltage suitable for the delicate contacts within the gauge mechanism 26, while the portion bridging the entire secondary furnishes current at a higher voltage suitable for operating the various contactors and control devices.

Figure 15:
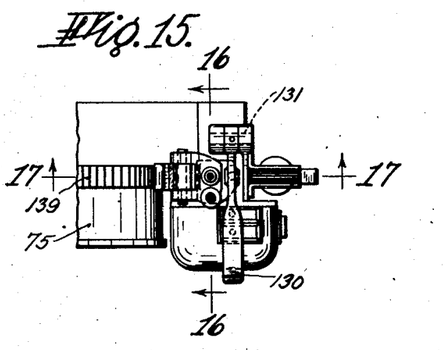
Fig. 15 is a detail in top plan of a portion of the ratchet feed mechanism for advancing the grinding wheel into the work during the progress of the grinding operation.
Figures 17, 18:
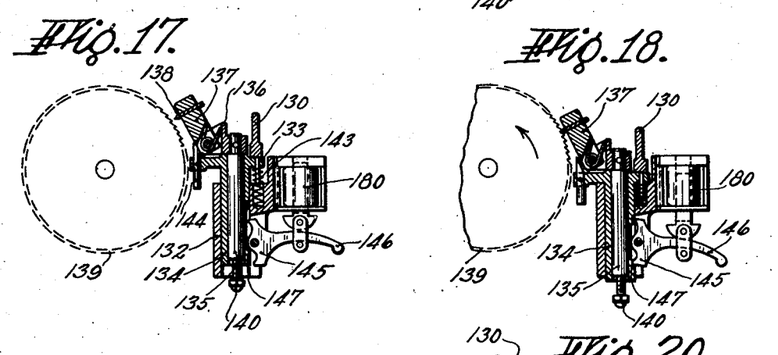
Fig. 17 is a detail section on line 17—17 of Fig. 15.
Fig. 18 is a detail similar to Fig. 17 but showing the parts in the position they occupy during the feeding operation.
Figure 20:
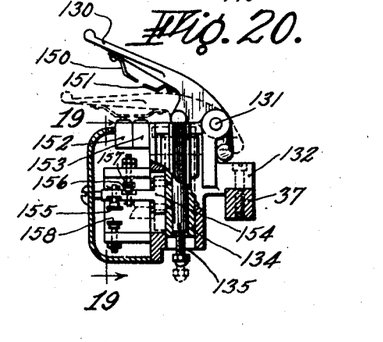
Fig. 20 is a detail from the right hand side of Fig. 15 with the parts partially in section.

When the machine is to be set in operation a handle 130 Figs. 1, 15 and 20, is depressed by the operator. This accomplishes several functions, both mechanical and electrical. The handle is pivoted at 131 to a bracket 132 arising from the main slide 37. In lowering the handle it strikes against a plate 133 (Fig. 17) forming the top of a sleeve 134 which can move vertically in the bracket 132. Passing freely through the sleeve is a rod 135 bearing at its upper end a bracket 136 pivotally supporting a pawl carrier 137. A pawl 138 in this carrier contacts the ratchet 139 and operates it step by step as the rod is reciprocated. This latter motion is accomplished by an adjustable tappet 140 which is contacted by a plate 141 (Fig. 1) actuated at intervals by a cam 142 on the shaft 31. If the sleeve is elevated, as it will be by a spring 143 unless otherwise restrained, a pawl throwout member 144 will strike the under side of the pawl carrier as shown in Fig. 17 and move the pawl to an inoperative position where it will not contact the ratchet irrespective of continued reciprocation of the rod 135.

Figure 16:
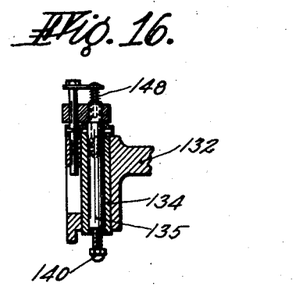
Fig. 16 is a detail section on line 16—16 of Fig. 15.

As the handle 130 is lowered it depresses the plate 133 and the sleeve 134 against the spring 143. In its lowered position the sleeve is releasably held by the engagement of a detent 145 on a pivoted handle 146 with a shoulder 147 on the sleeve. By raising the detent handle the sleeve will again be permitted to rise under the action of the spring. The lowering of the plate and sleeve into this releasably held position moves the throw-out 144 out of pawl disengaging position, and permits the pawl to move the ratchet in accordance with the reciprocations of the rod 135. This rod is preferably pressed downwardly by a spring 148, as shown in Fig. 16, in order to speed up its operation.

Figure 19:
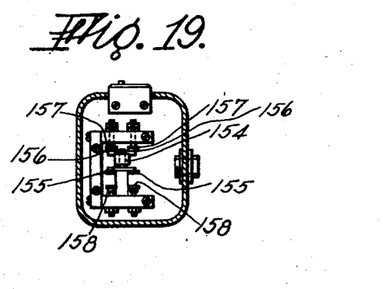
Fig. 19 is a detail of certain electrical contactors, taken on line 19—19 of Fig. 20.

Besides this activation of the pawl mechanism, the depression of the handle 130 performs certain electrical functions. In the first place fingers 150 and 151 on the handle depress the operating plungers of a pair of switches 152 and 153. These switches are of ordinary commercial design, and the detail of their construction need not be described in detail. The function that they perform in the electrical control will be considered in connection with the wiring diagrams later. In the second place the sleeve carries down with it a switch arm 154 (Figs. 19 and 20) bearing separate pairs of contactors 155 and 156. When the sleeve is up the contactors 155 close the circuit between stationary contactors 157, and when the sleeve is down this circuit is opened and the contactors 155 close the circuit between stationary contactors 158. In Fig. 21 and the partial diagrams dependent on it these four switches are shown as connected by a dotted line 159 which represents conventionally the mechanical connection between them. It should be noted that when the arm 130 is down the switches 158, 152 and 153 are closed, and that the switch 156 is open; the reverse condition of course obtaining when the arm is up.

Figure 22:
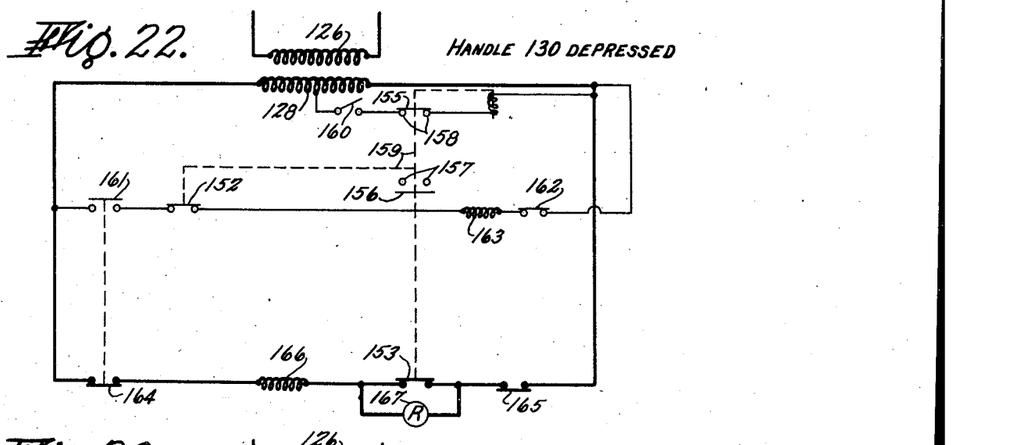
Figs. 22 to 28 are detail wiring diagrams of portions of the circuits shown in Fig. 21, the active portions of the circuits being shown in heavy lines and those portions inactive but important at the particular stage being considered being shown in light lines.

Fig. 22 represents the circuit condition when the handle 130 is first depressed. The switch 155, 158 is closed, but at the present this does not cause any action since the circuit is open at another point by a switch 160, which is the second contact in the gauge 26 and which corresponds to the switch 128, 129 of the Stowell Patent 1,926,603. It should here be observed that while the mechanical and electrical structure of the gauge itself is similar to that shown in the Stowell patent the manner in which the gauge contacts are connected to other parts may be quite different depending on the type of work. For example, the gauge is in the present case shown for illustration as being connected to continue the feed at the same rate until the second contact closes, whereas in the patent the rate of feed was decreased upon the closing of the first contact.

The switch 152 is also closed when the handle is depressed, but in this case as well no immediate effect is produced since the circuit through it is open at this time at a switch 161. The circuit through these switches also includes a solenoid actuated switch 162 and a control contactor 163 for the motor which rotates the pulley 33 and thus causes the work carrying head to oscillate. Since this motor is preferably controlled by an ordinary electrically operated switch the motor circuit itself has been omitted in the interest of clarity, the solenoid 163 of the contactor or control relay being alone shown. The same convention will be followed with other motors, the solenoid of the contactor being shown as representative of the whole motor circuit.

The depression of the handle also closes the switch 153, which is the only one of the four switches directly operated by the handle which produces an immediate effect, the others merely setting the stage for operations later to be produced by other means. The circuit through the switch 153 includes switches 164 and 165, which are closed at this time, and the action of which will be described later, and also a control solenoid 166 for the motor 62 which operates the main and the cross slides. The switch 153 is bridged by a relay 167 of a commercial type operating to close a circuit around the switch when the latter is once closed, and to maintain the circuit closed irrespective of the opening of the switch 153 bridged by it until the circuit is opened at another point by either of the switches 164 and 165. The motor 62 being energized, the main slide moves to carry the wheel within the work piece, and the cross slide then moves to position the wheel in initial grinding relation to the work. This is accomplished as described above by a continued rotation given by the motor to the shaft 57.

Figure 23:
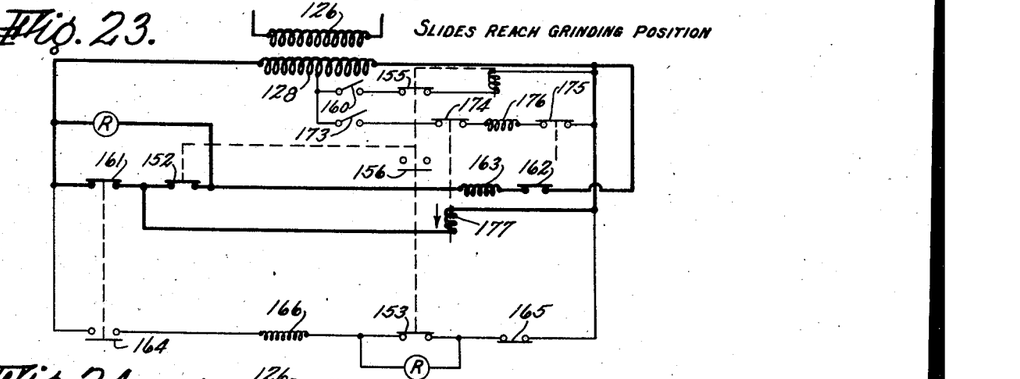
Figure 24:
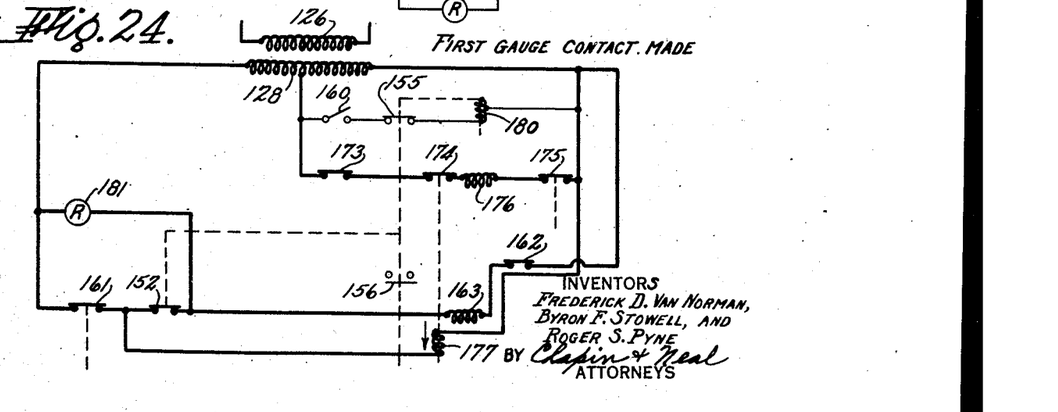
Figure 25:
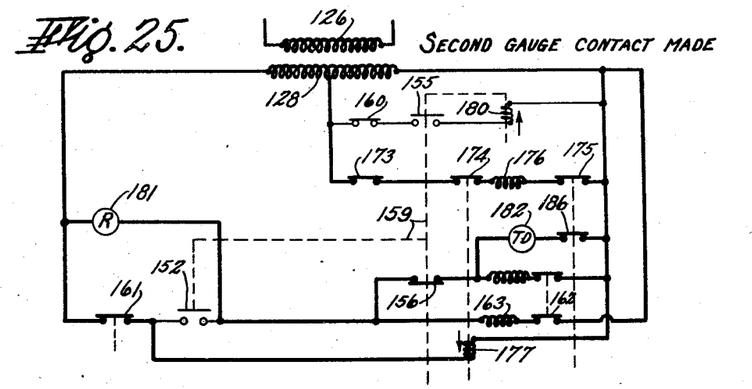
Figure 26:
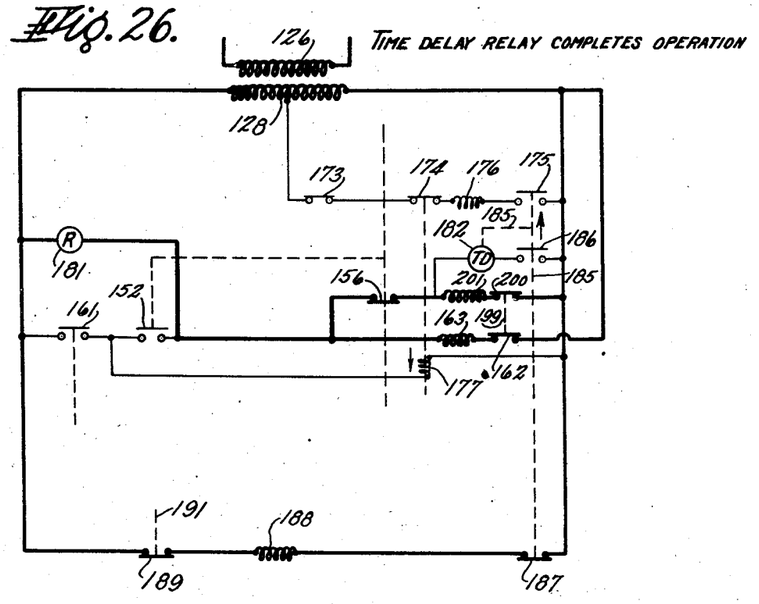

When the motion of the slides has been completed the shaft 57 has moved sufficiently so that an arm 170 thereon passes from the full line to the dotted line position of Fig. 10, and a spring pressed pin 171 on the arm contacts the operating plunger 172 of a double contactor, the switches of which are those numbered 161 and 164 and previously referred to. By this movement of the arm the switch 161 is closed and the switch 164 is opened, as indicated in Fig. 23. The opening of the switch 164 breaks the circuit through the slide motor control 166, and causes the relay 167 to open. The slide motor then stops, and remains inactive during the grinding operation. The closure of the switch 161 completes the circuit through the previously closed switches 152 and 162 through the control solenoid 163 for the motor which causes the work head to oscillate. This motor rotates the vertical shaft 31, causing oscillation of the work head through the crank 30 and causing progressive feeding movement of the ratchet head 75 by the cam 142. The grinding of the work piece continues in this fashion until it has reached a size permitting the first gauge contact to close.

This first gauge contact is here represented by the switch 173, which is in circuit with switches 174 and 175 and with the solenoid 176 of an electrically operated valve which controls the flow of coolant to the work piece. This valve is similar to the valve 155 of the Stowell Patent 2,036,658, and is normally open to permit flow of coolant. When the solenoid 176 is activated the valve is closed and the flow of coolant is stopped. The stage has been previously set for the operation of the gauge contact 173 by the closure of the switch 161 (Fig. 23), which closes a circuit through a solenoid 177 which operates to close the switch 174. The switch 175 is at this time in closed position, and is later opened as will be described. With the supply of coolant shut off the oscillation of the work piece and the feed of the grinding wheel is continued, the grinding being done dry for a short period in order that the finish may be improved. This dry grinding continues until the second gauge contact 160 is closed by the work reaching the predetermined size for which this contact is set.

When the second gauge contact is closed current flows momentarily through a solenoid 180 (Fig. 25) having a suitable coupling as shown in Figs. 17 and 18 to draw upwardly on the handle 146 and release the sleeve 134. The sleeve controls the four switches which were actuated by the depression of the handle 130, and in its function is represented by the dotted line 159. Raising the handle opens the switch 153 (Fig. 23) but this is without effect as the circuit through this switch has already been broken at the switch 164. It also breaks the circuit at the switch 152 (Fig. 25) but this is likewise without immediate effect since this switch is bridged by a shunting relay 181 similar to the relay 167 previously described. The relay 181 was closed as soon as current flowed through the switch 152, and remains closed until that circuit is subsequently broken at another point. The upward movement of the handle, as a third effect, opens the switch 155, which cuts off the current through the solenoid 180 and also breaks the circuit through the gauge switch 160 so that when this is later reset there will be no danger of arching through its delicate contact points. One immediate effect of the raising of the handle 130 depends upon its closing the switch 156, which is in the circuit of a time delay relay 182 and a switch 186 operated thereby but closed at this time. The time delay relay is also of a standard type, and need not be described in detail. It functions by operating certain switches a predetermined time after the circuit has been closed through the relay. At the present moment the time delay relay has thus started, but has itself done nothing. The second immediate effect of the raising of the handle 130 is to bring the member 144 against the underside of the pawl carrier 137 as in Fig. 17, thus terminating the feed. The supply of coolant is still shut off since current is still flowing through the solenoid 176, and dry grinding with no advance of the wheel into the work continues for the interval determined by the setting of the time delay relay.

The operation of the time delay relay, the mechanical function of which is indicated by the dotted line 185 (Fig. 26) is to open switches 175 and 186 and to close a switch 187. The switch 175 opens the circuit through the solenoid valve control 176, so that the flow of coolant is again resumed, and also opens the circuit through the gauge points 173 so that no arcing will take place when these are reset. The switch 186 is in the circuit of the time delay relay itself, so that this is stopped when it has run for the predetermined time. The switch 187 is in the circuit of a control solenoid 188 and a switch 189 which is closed at this time and is opened later as will be described. The control solenoid 188 causes operation of the motor 62 in the reverse direction from that in which it was operated by the solenoid 166, that is to say, in a direction to withdraw the slides from grinding position. As soon as the motor starts the arm 170 (Fig. 10) releases the plunger 172, causing switch 161 to be opened and switch 164 to be closed. Neither action produces any immediate effect, since the circuit around switch 161 is closed by the bridging relay (except for the circuit through solenoid 177 which is thus released to open switch 174 in the circuit already opened by switch 175), and since the circuit through switch 164 is open at switch 153. The oscillator motor still runs under the influence of the control solenoid 163, the circuit through which is still closed through the relay 181 and the switch 162. The short interval during the retraction of the slides is sufficient to produce enough cooling of the work to permit it to be handled.

Figure 27:
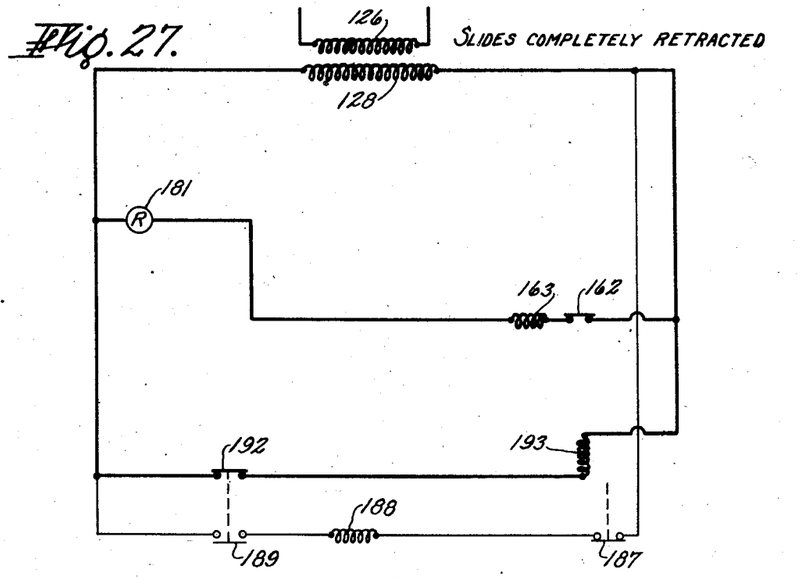
Figure 28:
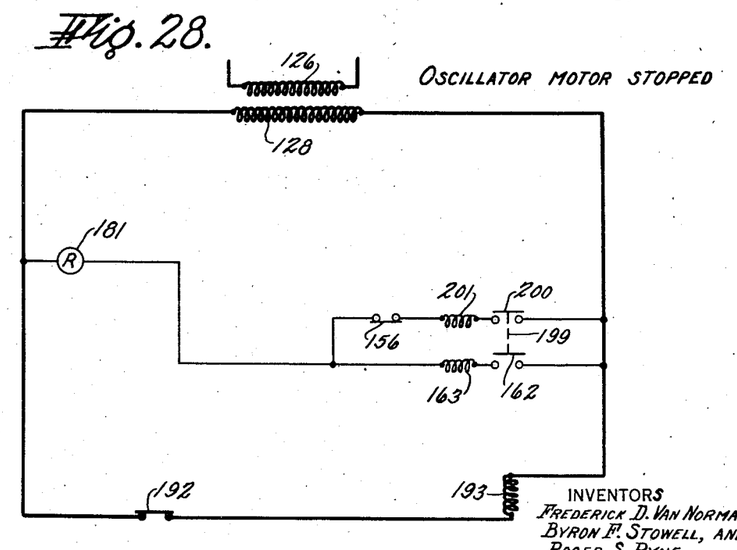

When the slides have been completely retracted the arm 170 (Fig. 10) has reached the full line position of that figure, and a pin 190 presses against the operating plunger 191 of a double switch 189, 192 (Fig. 27.) The switch 189 is opened to break the circuit through the motor reversing solenoid 188 and thus to stop the motor 62. The switch 192 is at the same time closed to complete the circuit through a solenoid 193 the function of which appears in Figs. 1, 3 and 4. To the core of this solenoid is attached a rod 194, at the upper end of which is pivoted a lever 195 normally held in the angular position of Fig. 4 by a spring 196. In the lowered position of the rod the lever is out of the range of a lug 197 adjustably mounted on the periphery of a disk 198 secured to the shaft 31. When the solenoid is energized to raise the rod 194 the lever will be moved outwardly by the lug when the latter is brought adjacent to it by the rotation of the shaft. In this outward motion the lever presses against the contacting roller 198 of a limit switch 199. This limit switch comprises two switches, as seen in Fig. 28; one of these being the switch 162 previously mentioned and the other a switch 200. The switch 162 is in the control circuit of the oscillator motor and by opening causes the motor to stop. It may be remarked here that this motor is preferably of that commercial type which is provided with an armature brake, this brake being thrown out of action by the flow of current and allowed to set by spring action when the current is cut off. As soon as the switch 162 is opened the motor operating the pulley 33 is caused to stop at once, arresting the oscillating work head 22 with great accuracy in any position determined by the setting of lug 197. The stoppage of the work carrying head in a definite angular position permits greater facility in replacing work pieces, and permits the use of automatic chuck loading devices with an oscillating work head.

The switch 200 is in the circuit of a solenoid 201 which is a part of the time delay relay, operating to hold the switches 175, 186, and 187 in the positions they assumed when the time delay relay operated. The breaking of the circuit through switch 200 thus operates to reset the switches controlled by the time delay relay in position for the start of another cycle. Both of the switches 162 and 200 being broken, no current can flow through the bridging relay 181 and that relay opens.

The description of the operation of the conventionally shown electrical devices has now been completed except for certain control elements which do not enter into the cyclical operation of the machine. Suitable main switches 210 and 211 are of course provided to permit current being shut off from all of the devices when desired. As a safety measure the switch 165 in the circuit which operates to cause the slides to be moved in, and a switch 203 which bridges the switch 187, are coupled together for manual operation so that if at any time it is desired to cause the slides to retract, this can be done without waiting for the termination of the grinding operation. Switches 204 and 205, which are normally in open and closed positions respectively, are provided to permit the oscillator motor to be operated without operating the controls. A further switch 206, provided with a bridging relay 207 and a stop switch 208, is provided in the circuit of a solenoid 209 which controls the motor 42 which operates the grinding wheel. The wheel is kept running throughout the operation of the machine, and the operation of these switches is therefore manual and is not subject to any of the controls referred to.

What we claim is:

1. A grinding machine comprising a base, a work carrier mounted on the base, a wheel carrier slidably mounted on the base for movement in a two directional path into or out of operative relationship to the work carrier, an electric motor, mechanical connections between the motor and the wheel carrier whereby rotation of the motor carries the wheel carrier through said two directional path, and automatically operating means for stopping the operation of said motor when movement through said two directional path has been completed.

2. In a grinding machine, a base, a slide thereon, a second slide mounted on the first for motion transversely thereof, a wheel carrier mounted on the second slide, a shaft, a crank on the shaft, a link spring coupled between the crank and the first slide, a stop positioned to arrest the movement of the first slide when it has reached grinding position while further motion of the shaft is permitted by said spring coupling, and means operated by said further motion of the shaft for moving the second slide.

3. In a grinding machine, a base, a slide thereon, a second slide mounted on the first for motion transversely thereof, a wheel carrier mounted on the second slide, a shaft, power means for rotating said shaft selectively in opposite directions, a crank on the shaft, a link spring-coupled between the crank and the first slide, a stop positioned to arrest the movement of the first slide when it has reached grinding position while further motion of the shaft is permitted by said spring coupling, means operated by said further motion of the shaft for moving the second slide, a stop for arresting the movement of the second slide when it has reached grinding position, and automatic means for arresting the movement of the power means upon the termination of the movement of the second slide.

4. A grinding machine comprising a base, a work carrier mounted on the base, a wheel carrier slidably mounted on the base for movement in a two directional path into or out of operative relationship to the work carrier, an electric motor, mechanical connections between the motor and the wheel carrier whereby rotation of the motor carries the wheel carrier through said two directional path, and means for operating the motor alternately in opposite directions to move the wheel carrier into or out of operative position with relation to the work carrier.

5. In an oscillating grinder, an oscillating work head, means for oscillating said head, a main wheel carrying slide, a cross slide transversely slidable on the main slide, wheel carrying means on the cross slide, a slide operating shaft, connections between said shaft and both of the slides to move them successively into or out of grinding position, by a continuous uninterrupted motion of the shaft, and means automatically operable to give to said shaft alternately a continuous, uninterrupted motion of sufficient magnitude to complete the motion of both slides, and to discontinue the motion of the shaft when the motion of the slides has been completed in either direction.

6. In an oscillating grinder, an oscillating work head, means for oscillating said head, a main wheel carrying slide, a cross slide transversely slidable on the main slide, wheel carrying means on the cross slide, a slide operating shaft, connections between said shaft and both of the slides to move them successively into or out of grinding position by a continuous uninterrupted motion of the shaft, means including a power driven element for giving to said shaft a continuous uninterrupted motion of sufficient magnitude to complete the motion of the slides into grinding position, and means controlled by the size of the work piece for rotating said shaft continuously and uninterruptedly in the opposite direction to move both said slides successively in the reverse order.

7. An oscillating grinder comprising an oscillating work head, a wheel head, means for advancing and retracting the wheel head to and from operative position with respect to the work head, a self-braking electric motor, connections between said motor and the oscillating head whereby the head will be oscillated during the running of the motor, and means automatically actuated upon the retraction of the wheel head for discontinuing the operation of the motor and hence stopping the oscillating head in a predetermined angular position.

8. An oscillating grinder comprising an oscillating work head, a wheel head, means for advancing and retracting the wheel head to and from operative position with respect to the work head, a self-braking electric motor, connections between said motor and the oscillating head whereby the head will be oscillated during the running of the motor, a limit switch for stopping the running of the motor, normally inoperative means for actuating the limit switch when the oscillating head reaches a predetermined angular position, and means activated by the retraction of the wheel head for rendering said normally inoperative means operative.

9. In an oscillating grinder of the type having feeding mechanism for causing relative approach of the wheel and work, a base or frame, a rotatable work holder mounted on the base for oscillatory movement about a vertical axis, a rotatable wheel carrier mounted for slidable movements on the base in directions both parallel with and angularly to the axis of rotation of the wheel carrier, mechanical means for rotation and oscillation of the work holder, mechanical means including a shaft supported in the base and being operable independently of the feeding mechanism for automatically moving the wheel carrier along its two separate directions of travel and into operative relation with the work holder, power means for actuating said shaft, a feeler for contacting the work during the grinding process, electrically operable devices for actuating the power means, and wiring connections including a switch between the feeler and said electrical devices, whereby movement of the feeler will actuate said electrical devices and thereby effect retractile movements of the wheel carrier in said two directions of travel.

10. In an oscillating grinder of the type having feeding mechanism for causing relative approach of the wheel and work, a rotatable work holder mounted to oscillate about an axis, a rotatable wheel carrier mounted for slidable movements towards and away from the work holder, mechanical means for causing oscillation and rotation of the work holder, a motor operatively connected to said means, mechanism causing slidable movements of the wheel carrier, electrical apparatus including a reversible motor connected to said mechanism whereby the wheel carrier may be moved towards or away from the work holder by reversing the rotation of the motor, a time delay unit associated with said electrical apparatus, a sizing device including a feeler to contact the work, and a circuit between the feeler and said electrical apparatus and operable when closed to actuate the time delay unit and through said unit to effect after a predetermined lapse of time a reverse rotation of the second named motor and thus separate the wheel and work.

11. A grinding machine comprising a frame, a work head supported thereon, a wheel head supported on the frame for slidable movement in a two directional path towards and away from the work head, a shaft supported in the base, mechanism operable by a continuous and uninterrupted motion rotation of said shaft for effecting said slidable movement, a positioning stop or abutment to terminate said slidable movement in one direction of travel, said mechanism including a compressible spring permitting overtravel of the shaft when the wheel head contacts said abutment, power means to actuate said shaft, and means for terminating the actuation of the shaft by the power means automatically upon the completion of said two directional movement.

12. A grinding machine comprising a base, a slide mounted on said base, a second slide mounted for movement in the first slide transversely to the direction of movement thereof, a head carried on the second slide, a second head carried on the base, one of said heads carrying the grinding wheel and the other the work to be ground, a shaft journaled in the base, a stop limiting the travel of the first slide, means connecting the shaft with the first slide including a compression spring to permit overtravel of the shaft when the movement of the slide is arrested by the stop, a screw having threaded connection with the second slide, means controlled by the overtravel of the shaft for shifting said screw longitudinally and for holding it in shifted position, and means for rotating said screw after it has been so shifted for causing feeding movement of the second slide.

13. A grinding machine comprising a base, a slide mounted on said base, a second slide mounted for movement in the first slide transversely to the direction of movement thereof, a head carried on the second slide, a second head carried on the base, one of said heads carrying the grinding wheel and the other the work to be ground, a shaft journaled in the base, a stop limiting the travel of the first slide, means connecting the shaft with the first slide including a compression spring to permit overtravel of the shaft when the movement of the slide is arrested by the stop, a screw having threaded connection with the second slide, a stop limiting the longitudinal movement of the screw, means controlled by the overtravel of the shaft and including a compression spring for shifting said screw longitudinally against the stop and for holding it in shifted position by the compression of said last-named spring, and means for rotating the screw after it has been so shifted for causing feeding movement of the second slide.

14. A grinding machine comprising a base, a slide mounted on said base, a second slide mounted for movement in the first slide transversely to the direction of movement thereof, a head carried on the second slide, a second head carried on the base, one of said heads carrying the grinding wheel and the other the work to be ground, a shaft journaled in the base, a stop limiting the travel of the first slide, means connecting the shaft with the first slide including a compression spring to permit overtravel of the shaft when the movement of the slide is arrested by the stop, a screw having threaded connection with the second slide, a stop limiting the longitudinal movement of the screw, means controlled by the overtravel of the shaft and including a compression spring for shifting said screw longitudinally against the stop and for holding it in shifted position by the compression of said last-named spring, means for rotating the screw after it has been so shifted for causing feeding movement of the second slide, a reversible electric motor connected to the shaft, and means for automatically stopping the rotation of said motor after both slides have been brought into contact with their respective stops.

15. A grinding machine comprising a base, a slide mounted on said base, a second slide mounted for movement in the first slide transversely to the direction of movement thereof, a head carried on the second slide, a second head carried on the base, one of said heads carrying the grinding wheel and the other the work to be ground, a shaft journaled in the base, a stop limiting the travel of the first slide, means connecting the shaft with the first slide including a compression spring to permit overtravel of the shaft when the movement of the slide is arrested by the stop, a screw having threaded connection with the second slide, a stop limiting the longitudinal movement of the screw, means controlled by the overtravel of the shaft and including a compression spring for shifting said screw longitudinally against the stop and for holding it in shifted position by the compression of said last-named spring, means for rotating the screw after it has been so shifted for causing feeding movement of the second slide, a reversible electric motor connected to the shaft, means for automatically stopping the rotation of said motor after both slides have been brought into contact with their respective stops, work sizing devices, means activated by the work sizing devices for causing reverse roation of the motor for retracting the slides to their original positions, and means for automatically stopping the reverse rotation of the motor when the first slide has reached its original position.

16. In a grinding machine the combination of a bed, a work holder and a tool carriage carried thereby for movement the one relatively to the other, means for actuating the tool carriage at a slow feeding rate, means for actuating the tool carriage at a rapid rate including a motor, mechanism operatively connecting the motor and the tool carriage, a work sizing device, two separate switches for the motor, separate means associated with each of said switches to determine the direction of rotation of the motor and the direction of movement of the tool carriage, one of said switches being manually operable to determine the rotation of the motor in one direction and effect movement of the tool carrier towards the work, and means initiated in its operation through movement of the work sizing device to actuate the other switch to cause rotation of the motor in a reverse direction and effect movement of the tool carrier away from the work.

17. In a grinding mchine the combination of a bed, a work holder and a tool carriage supported thereon for movement the one relatively to the other, means for actuating the tool carriage including a motor, mechanism operatively connecting the tool carriage and motor, a feeler to contact the work, two switches for the motor, means associated with one switch to cause rotation of the motor in one direction, and means associated with the other of said switches to cause rotation of the motor in a reverse direction, the actuation of one of said switches being responsive to a movement of said feeler.

18. In a grinding machine having mechanism for causing relative approach of the wheel and work, a base, a work holder, a wheel carrier slidably supported on the base for separate movements with respect to the work holoder in directions longitudinaly and laterally of the axis of the wheel carrier, means for causing said slidable movements of the wheel carrier including a motor, mechanism operatively connecting the wheel carrier and said motor to effect such slidable movements, two switches for the motor, means associated with one of said switches to cause rotation of the motor in one direction to thereby effect movements of the wheel towards the work in said two directions of its travel, and separate means associated with the other switch to cause rotation of the motor in the opposite direction to effect movement of the wheel away from the work in said two directions.

19. An oscillating grinder comprising a base, a rotatable work holder mounted on the base for oscillatory movements about an axis, a wheel carrier mounted on the base for slidable movement in two directions relative to the work holder, power means, mechanism connecting the power means and the wheel carrier, a starting switch, means initiated by actuation of said switch and associated with said mechanism to effect advance movements of the wheel carriage in said two directions of travel to carry the wheel into grinding relation with the work, separate means associated with the wheel carrier and work holder and including a switch operable to initiate a slow cutting movement of the wheel into the work and to effect rotary and oscillatory movements of the work holder, a sizing device including a feeler to contact the work, and means responsive to movement of the feeler when the work has reached a predetermined size to cause reverse movements of the wheel carrier in said two directions of travel to separate the wheel from the work and to stop both rotation and oscillation of the work holder and thus permit removal of the finished work piece.

20. An oscillating grinder comprising a base, a rotatable work holder and a wheel carrier separately supported on the base, the wheel carrier being mounted for slidable movements with respect to the work holder and the work holder being mounted for oscillatory movements about an axis, power means, connections between said means and the wheel carrier, a sizing device including a feeler to contact the work, a starting switch, means associated with this switch and said connections to effect a rapid advance movement of the wheel into grinding relation with the work, separate means including a switch operable to effect a slow cutting feed of the wheel into the work and to effect oscillatory movements of the work holder, means initiated by movement of the feeler when the work has reached a predetermined size to effect a reverse slidable movement of the wheel carrier to thereby remove the wheel from proximity with the work and to stop oscillation of the work carrier.

21. A radius grinder comprising a base, a rotatable work holder and a wheel carrier separately supported on the base, the wheel carrier being mounted for slidable movements with respect to the work holder and the work holder being mounted for oscillatory movements about an axis, power means, connecting mechanism between the power means and the wheel carrier, a starting switch, means associated with the switch and said connecting mechanism to effect advance movement of the cutting wheel into close proximity with the work, a feeler to contact the work, a second switch, means initiated by actuation of said switch to effect a slow cutting feed to the wheel carrier and both rotary and oscillatory movements of the work holder, and separate means responsive to movement of the feeler and including a time relay device, operable to first terminate the feeding movement of the wheel carrier and thereafter to effect a rapid reverse movement of the wheel carrier thus removing the wheel from proximity with the work and to stop the rotary and oscillatory movements of the work holder.

22. A radius grinder comprising a base, a work holder and a tool carrier supported for relative movements thereon, the work holder being mounted for oscillatory movements about an axis and the tool carrier being slidably mounted with respect to the work holder, power means, a shaft associated with the power means, means for reversing the directional rotation of the shaft, connections between the shaft and the tool carrier, a switch associated with said reversing means and actuable to effect advance slidable movement of the tool into operative relation with the work through rotation of said shaft, means operable for slow feeding movement of the tool into the work, a feeler to contact the work, means to supply a flow of coolant onto the work, means responsive to movement of the feeler when the work has reached a predetermined size to suspend the flow of coolant, means including a switch actuable through movement of the feeler to first stop the feeding movement of the tool and thereafter through a connecting time relay to effect a reverse directional rotation of the shaft and thereby remove the tool from proximity with the work, and means to effect rotation and oscillation of the work holder.

23. An oscillating grinder comprising a base, a work head and a wheel carrier separately supported thereon, the work head being mounted to oscillate about an axis and the wheel carrier being mounted for relative sliding movement with respect to the work head, power means for oscillating the work head including a vertical shaft, mechanism operably connecting said shaft and work head, a projecting finger rotatable with said shaft, a member releasably restrained against free contact with said finger, means to release the restrained member to thus permit its contact with said rotating finger, and means including a switch actuable through movement of said member to stop the power means and thereby to stop the oscillations of the work head in a predetermined angular position.

24. In an oscillating grinder of the type having feeding mechanism for causing relative approach of the wheel and work, a work holder adapted to oscillate about a vertical axis, power means for causing rotation and oscillation of the work holder, mechanism connecting the power means and the work holder including a shaft, a lug rotatably carried by the shaft, a member restrained against contact with said lug during a period of the shaft's rotation, means including electrical devices operable to release the restrained member and thus permit its contact with said lug, and means including a switch actuable during the contact between said member and lug to terminate both rotation and oscillatory movements of the work holder when in a relatively predetermined angular position.

25. In a radius grinder of the type having feeding mechanism for relative approach of the wheel and work, a work holder mounted to oscillate about an axis, power means for oscillating the work holder, mechanism connecting the power means and work holder and including a rotatable element, a lug adjustably supported on said element, a member releasably restrained against contact with the lug during a series of the lug's rotations, means operable to release the restrained member and permit its contact with said lug, and means operable by such contact to effect a termination of the oscillatory movements of the work holder when it is positioned at a relatively predetermined angle with respect to the wheel.

26. In a grinding machine of the class described, a wheel carrying slide, a threaded screw operatively connected with the slide for causing slow feeding movement thereof, means for effecting axial movement of the screw including a lever, a stop to limit the axial movement of the screw in one direction, means to hold the screw against the stop during the grinding operation, means to release the screw from its contact with said stop, means for causing axial movement of the screw away from the stop, and means to rotate the screw independently of said last-named means.

27. In a grinding machine of the class described, a wheel carrying slide, a threaded screw operatively connected with the slide for causing slow feeding movement thereof, means including a lever device for causing axial movement of the screw in one direction, an adjustable stop to limit the axial movement of the screw in said direction, means to hold the screw against the stop, means associated with the lever device for releasing the screw from its contact with the stop, means for causing axial slidable movement of the screw away from the stop, and means to rotate the screw independently of said lever device.

28. In a grinding machine of the type having feeding mechanism for relative approach of the tool and work, a slide, a threaded screw operatively connected with the slide for causing slow feeding movement thereof, means for rotating the screw, means for causing axial movement of the screw without rotation thereof to effect a rapid movement of the slide, an abutment or stop to limit said axial movement of the screw in one direction, means to hold the screw against said stop during the progress of the cutting operation, means to permit the stop to rotate with the screw but without axial movement, while maintaining said abutment contact therebetween, and means to release the screw from its contact with the stop and permit reverse axial movement of the screw away from said stop.

29. In a radius grinder of the type having feeding mechanism for causing relative approach of the wheel and work, a frame, a workhead and a wheel head mounted thereon, one of said heads being adapted to oscillate about an axis, the other head being slidably movable with respect to the oscillatable head, power means, mechanism connecting the power means and the oscillatable head and including a rotatable member, electrical connections associated with said member and including a switch, means associated with the member and operable during the rotation of said member to actuate said switch, and means operable upon such actuation to terminate the oscillatory movement of said head when in a relatively predetermined position with respect to the slidable head.

30. An oscillating grinder comprising an oscillating head, a cooperating head movable with respect thereto, an electric motor, connections between the motor and the oscillating head for causing oscillatory motion of the latter, means for arresting motion of the motor including a switch, and means operable only in a predetermined angular position of the operating head for actuating the switch to arrest the motor.

31. In a grinding machine, a base, a tool carrying head and a work holding head mounted thereon, one of said heads being movable with respect to the other head, a reversible rotary motor, mechanism connecting the motor and the movable head to move the heads into and out of operable relation, a feeler to contact the work, two switches for the motor, each switch controlling the rotation of the motor in one direction, means controlling one switch thereby to effect rotation of the motor in one direction and cause movement of the heads into operable relation, and mechanism responsive to a movement of the feeler to actuate the other of said switches and thereby effect rotation of the motor in a reverse direction to cause movement of the heads out of operable relation.

FREDERICK D. VAN NORMAN.
BYRON F. STOWELL.
ROGER S. PYNE.